（12）United States Patent
Woolcock

(10) Patent No.: US 10,486,791 B2
(45) Date of Patent: Nov. 26, 2019

(54) AEROFOIL STRUCTURE COMPONENTS

(71) Applicant: Airbus Operations Limited, Bristol (GB)

(72) Inventor: John Woolcock, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 72 days.

(21) Appl. No.: 15/829,146

(22) Filed: Dec. 1, 2017

(65) Prior Publication Data

US 2018/0155004 A1    Jun. 7, 2018

(30) Foreign Application Priority Data

Dec. 2, 2016 (GB) .................................. 1620532.0

(51) Int. Cl.
*B64C 3/26* (2006.01)
*B64C 3/18* (2006.01)
*B64C 1/00* (2006.01)

(52) U.S. Cl.
CPC ............... *B64C 3/185* (2013.01); *B64C 3/26* (2013.01); *B64C 2001/0072* (2013.01)

(58) Field of Classification Search
CPC ... B64C 3/185; B64C 3/26; B64C 2001/0072; B64C 3/28
USPC .............................................. 244/123.3, 131
See application file for complete search history.

(56) References Cited

U.S. PATENT DOCUMENTS

| 3,780,969 | A | 12/1973 | Nussbaum et al. |
| 6,237,873 | B1 | 5/2001 | Amaoka et al. |
| 6,355,133 | B1 * | 3/2002 | Williams ............. B29C 70/205 156/296 |
| 6,474,604 | B1 * | 11/2002 | Carlow ................. B64C 39/062 244/198 |
| 8,157,213 | B2 * | 4/2012 | Escobar Benavides .................... B29C 70/202 244/123.1 |
| 8,684,309 | B2 | 4/2014 | Wildman |
| 8,844,872 | B2 | 9/2014 | Sanderson et al. |
| 8,864,076 | B2 * | 10/2014 | Wood ..................... B29C 70/30 244/123.1 |
| 8,870,120 | B2 | 10/2014 | Sanderson et al. |
| 9,322,276 | B2 * | 4/2016 | Guinaldo Fernandez .................... B64C 3/28 |
| 2007/0175573 | A1 * | 8/2007 | Fox ........................ B29C 70/34 156/196 |
| 2010/0065687 | A1 * | 3/2010 | Douglas ................. B64C 3/185 244/130 |

(Continued)

FOREIGN PATENT DOCUMENTS

| CA | 2831516 A1 * | 5/2014 | ............. B64C 3/185 |
| GB | 756392 A * | 9/1956 | ............. B21D 53/00 |
| WO | WO-2008121005 A1 * | 10/2008 | ............. B64C 1/06 |

OTHER PUBLICATIONS

Combined Search & Examination Report for GB 1620532.0, dated May 24, 2017, 8 pages.

*Primary Examiner* — Christopher P Ellis
(74) *Attorney, Agent, or Firm* — Nixon & Vanderhye P.C.

(57) ABSTRACT

A component for an aerofoil structure including a unitary member having a spar; a cover panel; and a substantially flat intermediate section which connects the spar to the cover panel. The spar, the cover panel and the intermediate section are integrally formed such that a first angle between the intermediate section and the cover panel and a second angle between the intermediate section and the spar are both in the range 90° to 180°.

24 Claims, 5 Drawing Sheets

(56) References Cited

U.S. PATENT DOCUMENTS

| | | | | |
|---|---|---|---|---|
| 2010/0148010 A1* | 6/2010 | Hunter | ............. | B64C 3/28 |
| | | | | 244/199.4 |
| 2010/0178453 A1 | 7/2010 | Wood | | |
| 2012/0328819 A1* | 12/2012 | Motohashi | ......... | B29D 99/0003 |
| | | | | 428/56 |
| 2013/0026295 A1* | 1/2013 | Schlipf | ............. | B64C 3/28 |
| | | | | 244/123.7 |
| 2015/0048207 A1* | 2/2015 | Williams | ............. | B64C 3/00 |
| | | | | 244/123.7 |
| 2015/0183506 A1* | 7/2015 | Garc A Mart N | ...... | B32B 37/02 |
| | | | | 244/123.1 |
| 2016/0068250 A1* | 3/2016 | Meyer | ............. | B64C 3/14 |
| | | | | 244/123.1 |
| 2016/0176499 A1* | 6/2016 | Evans | ............. | B64C 3/18 |
| | | | | 244/123.1 |
| 2016/0332392 A1* | 11/2016 | Price | ............. | B32B 3/04 |
| 2017/0291687 A1* | 10/2017 | Everaert | ............. | B64F 5/10 |
| 2017/0327203 A1* | 11/2017 | Holmes | ............. | B64C 3/26 |
| 2018/0022439 A1* | 1/2018 | Stanley | ............. | B64C 3/182 |
| | | | | 244/171.7 |
| 2018/0072401 A1* | 3/2018 | Uckert | ............. | B64C 3/28 |
| 2018/0086429 A1* | 3/2018 | Sheppard | ............. | B64C 3/185 |
| 2019/0002080 A1* | 1/2019 | Schlipf | ............. | B64C 3/185 |
| 2019/0061907 A1* | 2/2019 | Corrao | ............. | B64C 3/26 |

* cited by examiner

AEROFOIL STRUCTURE COMPONENTS

CROSS RELATED APPLICATION

This application claims priority to United Kingdom patent application GB 1620532.0 filed 2 Dec. 2016, the entirety of which is incorporated by reference.

TECHNICAL FIELD

The present invention relates to a component for an aerofoil structure, and to a method for use in assembling an aerofoil structure.

BACKGROUND

An aerofoil structure typically comprises a torsion box structure, which includes one or more longitudinal spars, a plurality of transverse ribs, and is enclosed by structural covers. Aerofoil structures may be found in a variety of aircraft, spacecraft and wind turbine applications, for example.

When applied to aircraft wings and stabilizers the torsion box is often referred to as the "wing box". A wing box construction used commonly in commercial airliners includes a front spar, a rear spar, an upper wing cover (skin) extending between the front spar and the rear spar, and a lower wing cover (skin) extending between the front spar and the rear spar. Each of the front and rear spars may be formed as a C-section with upper and lower flanges extending from an upstanding web. The upper and lower wing covers may be attached to the flanges of the front and rear spars. Leading and trailing edge structures of the wing, such as the leading edge D-nose, may be supported by butt-straps attached to overhanging edges of the upper and lower covers.

The use of composite materials to replace traditional metallic aerospace materials provides opportunities to improve the wing box construction. In particular, it has been proposed to integrally form at least one of the front and rear spars with either the upper wing cover or the lower wing cover to form a unitary member. However, combining the lower (or alternatively upper) wing cover with a spar eliminates the cover overhang traditionally used to support a leading or trailing edge structure. An alternative way of mounting a leading or trailing edge structure on a wing box is therefore required.

SUMMARY

A first aspect of the present invention provides a component for an aerofoil structure. The component comprises a unitary member which comprises a spar; a cover panel; and a substantially flat intermediate section which connects the spar to the cover panel. The spar, the cover panel and the intermediate section are integrally formed, such that a first angle between the intermediate section and the cover panel and a second angle between the intermediate section and the spar are both in the range 90° to 180°.

Optionally, the first angle and the second angle are selected such that the plane of the intermediate section intersects a location on a leading or trailing edge part of the aerofoil structure at or near a location at which an in-flight load is expected to be applied to the aerofoil structure.

Optionally, the first angle and the second angle are selected such that the plane of the intermediate section intersects a location on a moveable device mounted on a leading or trailing edge part of the aerofoil structure, when the moveable device is in a deployed position, wherein the location is a location at which an in-flight load is expected to be applied to the moveable device. Optionally, the moveable device is a high-lift device. Optionally, the moveable device is configured to move between a retracted position in which the moveable device is relatively close to the leading or trailing edge structure in the streamwise direction, and the deployed position in which the moveable device is relatively further from the leading or trailing edge structure in the streamwise direction. Optionally, the moveable device is one of: a slat; a flap.

Optionally, the component further comprises at least one mounting feature extending from the intermediate section in a streamwise direction, for facilitating attachment of a leading or trailing edge structure of the aerofoil to the component.

Optionally, the at least one mounting feature comprises a plurality of brackets fixedly attached to the intermediate section. Optionally, the plurality of brackets are spaced along the intermediate section in the spanwise direction according to a predetermined arrangement corresponding to an arrangement of mounting features on a leading or trailing edge structure which is to be attached to the component. Optionally, each bracket is additionally fixedly attached to the spar.

Optionally, each bracket is configured to pivotally attach to a leading or trailing edge structure of the aerofoil, such that the leading or trailing edge structure is pivotable about a spanwise axis. Optionally, each bracket comprises at least one hole extending through the bracket in a spanwise direction, for receiving a pivot pin.

Optionally, the at least one mounting feature comprises a bar having at least one substantially flat face, wherein the at least one substantially flat face is fixedly attached to the intermediate section. Optionally, the bar is configured to house one or more aircraft system components which run along the aerofoil structure in the spanwise direction.

Optionally, the component further comprises a seal for sealing a gap between the cover and a leading or trailing edge structure attached to the component by the at least one mounting feature.

Optionally, the cover panel forms part of an outer surface of the aerofoil structure.

Optionally, the spar, intermediate section and cover panel comprise a unitary piece of a composite material.

A second aspect of the present invention provides an aerofoil structure comprising a component according to the first aspect.

Optionally, the aerofoil structure further comprises a leading or trailing edge structure attached to the component. Optionally, the component further comprises at least one mounting feature extending from the intermediate section in a streamwise direction. Optionally, an upper part of the leading or trailing edge structure is pivotally attached to the at least one mounting feature such that the leading or trailing edge structure is pivotable about a spanwise axis. Optionally, the aerofoil structure comprises a link member disposed between the upper part of the leading or trailing edge structure and the at least one mounting feature. Optionally, a first end of the link member is pivotally attached to the at least one mounting feature such that that the link member is pivotable about a spanwise axis, and a second end of the link member is pivotally attached to the leading or trailing edge structure, such that the leading or trailing edge structure and the link member are each pivotable about a spanwise axis.

Optionally, the aerofoil structure is an aircraft wing.

A third aspect of the present invention provides a method for use in assembling an aerofoil structure. The method comprises:

providing a unitary member comprising a spar, a cover panel, and a substantially flat intermediate section connecting the spar to the cover panel, wherein the spar, cover panel and intermediate section are integrally formed such that a first angle between the intermediate section and the cover panel and a second angle between the intermediate section and the spar are both in the range 90° to 180°;

providing at least one first mounting feature on the intermediate section, positioned to correspond to a second mounting feature comprised in a leading or trailing edge structure of the aerofoil structure;

arranging the leading or trailing edge structure adjacent the unitary member; and attaching the first mounting feature to the second mounting feature.

Optionally, providing at least one first mounting feature on the intermediate section comprises providing the at least one first mounting feature according to a predetermined arrangement based on an arrangement of second mounting features comprised in the leading or trailing edge structure.

Optionally, the at least one first mounting feature comprises a first preformed fastener hole, the second mounting feature comprises a second preformed fastener hole, and attaching the first mounting feature to the second mounting feature comprises inserting a fastener through the first and second preformed fastener holes.

BRIEF DESCRIPTION OF THE DRAWINGS

Embodiments of the invention will now be described, by way of example only, with reference to the accompanying drawings, in which:

FIG. 3b shows a schematic top-view of part of the example torsion box shown in FIG. 3a;

FIG. 4b shows a schematic top-view of part of the example torsion box shown in FIG. 4a;

DETAILED DESCRIPTION

Figure 1:
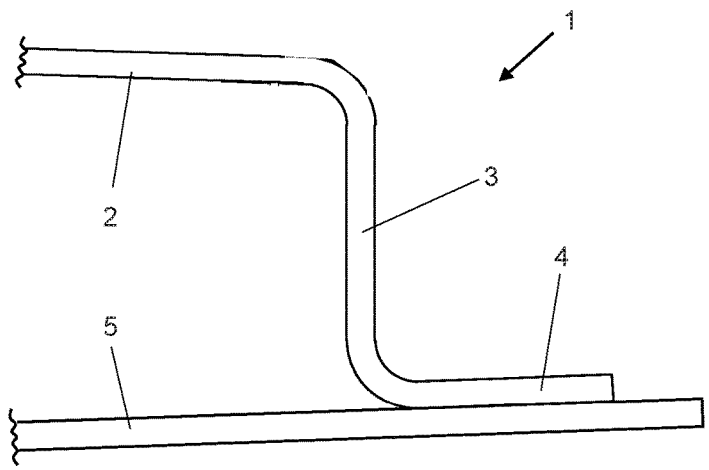
FIG. 1 shows a schematic cross-section through part of a prior art torsion box.

FIG. 1 is a cross-section through part of a prior art torsion box for an aircraft wing. The torsion box 1 includes a unitary member comprising a spar 3, an upper wing cover 2, and an outwardly extending flange 4, which are all integrally formed to create the unitary member. A lower wing cover 5, which is a separate component to the unitary member formed by the spar 3, upper wing cover 2 and flange 4, is attached to the flange 4. In the illustrated example, only a leading part of the torsion box 1 is shown. A trailing part of the torsion box 1 may have a similar integrated spar and cover, or alternatively may have a conventional C-section rear spar, or indeed any other suitable arrangement. The outer surface of the upper cover 2 and the outer surface of the lower cover 5 form outer aerodynamic surfaces of the aircraft wing.

The lower cover 5 overhangs the flanges 4. To form the aircraft wing, one or more leading edge structures (not shown) and one or more trailing edge structures (not shown) are attached to the torsion box 1 to complete the aerofoil profile. It will be appreciated that a lower part of a leading edge structure can be attached to overhanging lower cover 5 in a conventional manner, using butt straps and fasteners. However, this mounting technique cannot be used to mount the upper part of such a leading edge structure, because the upper cover does not overhang the spar, due to the spar and upper cover being integrally formed.

In the prior art torsion box of FIG. 1, the unitary member comprises a smooth radiused bend between the integrally formed cover panel and spar. The examples of the invention described herein relate to components for aerofoil structures comprising unitary member which have a novel cross-sectional shape. The novel cross-sectional shape facilitates mounting leading or trailing edge structures to the example unitary members.

Figure 2:
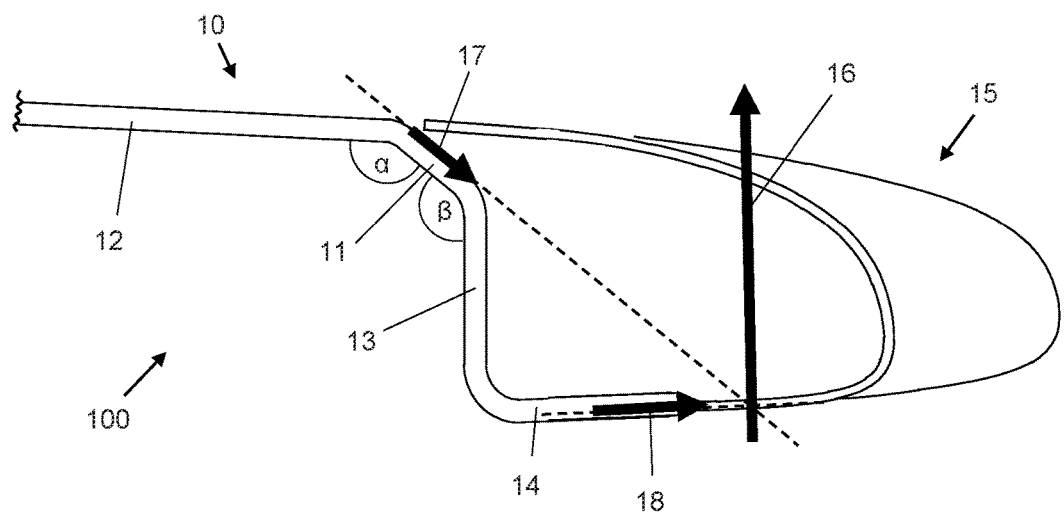
FIG. 2 shows a schematic cross-section through part of an example torsion box according to the invention, on which an example leading edge structure is mounted.

FIG. 2 is a cross-section through an example component 100 for an aerofoil structure, according to the present invention. The example component 100 comprises a unitary member 10, which in turn comprises a spar 13, a cover panel 12, and a substantially flat intermediate section 11 which connects the spar 13 to the cover panel 12. The spar 13, cover panel 12 and the intermediate section 11 are integrally formed such that a first angle $\alpha$ between the intermediate section and the cover panel and a second angle $\beta$ between the intermediate section and the spar are both in the range 90° to 180°. The values of the first and second angles $\alpha$ and $\beta$ may be such that the spar 13 and the cover panel 12 are substantially perpendicular to each other. To be substantially perpendicular, the values of the first and second angles $\alpha$ and $\beta$ may be such that the angle enclosed by the spar 13 and the cover panel 12 is in the range 80° to 100°. The values of the first and second angles $\alpha$ and $\beta$ may be such that the sum of the first and second angles $\alpha$ and $\beta$ is in the range 250° to 290°. The intermediate section 11 is not coplanar with either the spar 13 or the cover panel 12.

The cover panel 12 forms part of an outer surface of the aerofoil structure. In the particular illustrated example the spar 13 is a front spar and the cover panel 12 is an upper cover panel, although in other examples the spar 13 may be a rear spar and/or the cover panel 12 may be a lower cover panel.

In the particular example, the unitary member 10 further comprises a flange 14 extending outwardly from the spar 13, which is integrally formed with the spar. The flange 14 is connected to the spar 13 by a smooth radiused bend. The flange 14 may facilitate mounting of a lower cover panel (not shown) and/or the lower part of a leading edge structure. FIG. 2 shows an example leading edge structure 15 mounted on the unitary member 10. The lower part of the leading edge structure 15 may be mounted in a conventional manner, e.g. by using butt straps and fasteners to fix the lower part of the leading edge structure 15 to an overhanging part of a lower cover panel. The upper part of the leading edge structure 15 can be mounted by way of one or more mounting features provided on the unitary structure 10. For example, the unitary member 10 may be provided with at least one mounting feature extending from the intermediate section in a streamwise direction, for mounting a leading or trailing edge structure of the aerofoil. Two such example mounting features will be described later on with reference to FIGS. 3*a*-*b* and 4*a*-*b*.

The unitary member 10 may be formed from a composite material, for example a laminated composite material, such that the spar, intermediate section and cover panel comprise a unitary piece of the composite material. The thickness of the unitary member 10 may be substantially the same for all regions of the unitary member 10. In some examples the unitary member 10 may comprise one or more features (e.g. holes) to facilitate direct mounting of the leading edge structure 15 to the unitary member 10, or to facilitate attachment of mounting features to which the leading edge structure 15 can be attached.

The spar 13 and the cover panel 12 may be substantially perpendicular, or close to perpendicular. The spar 13 may extend in the spanwise and vertical (with respect to the orientation shown in FIG. 2) directions. The cover panel 12 may extend in the spanwise and horizontal (or streamwise/chordwise) directions.

During flight, an aerofoil structure comprising the component 100 will experience an applied load in the location and direction indicated by the arrow 16. The applied load 16 will typically be experienced (to varying degrees) along the full span of the aerofoil structure. The applied load 16 must be transferred to the unitary member 10 (which forms part of a torsion box of the aerofoil structure) via the mounting mechanism used to attach the leading edge structure 15 to the unitary member 10.

In some examples, the geometry of the unitary member 10 is arranged such that the planes (indicated by the dashed lines on FIG. 2) corresponding to the two surfaces of the unitary member to which the leading edge structure 15 is attached intersect at or near the point (location) of application of the applied force 16. Advantageously, this means that the reaction loads experienced by the attachment mechanisms (e.g. fasteners) will be substantially or entirely shear dominated. This results in an efficient transfer of load, and allows the attachment mechanisms to be significantly smaller and lighter than would be the case if they also had to handle any significant amount of loading in a direction perpendicular to their respective attachment surfaces. Therefore, in some examples the first angle $\alpha$ and the second angle $\beta$ are selected such that the plane of the intermediate section intersects an intersection location on a leading or trailing edge part of the aerofoil structure at or near a load application location at which an in-flight load is expected to be applied to the aerofoil structure. In some examples the first angle $\alpha$ and the second angle $\beta$ are selected such that the plane of the intermediate section intersects the plane of the flange 14 at an intersection location which is at or near the load application location.

The exact location at which the in-flight load is applied may vary during flight, due to varying flight conditions. Therefore, in some examples the intersection location may be selected based on a plurality of locations at which the in-flight load is expected to be applied. For example, the intersection location may be an average of a plurality of locations at which the in-flight load is expected to be applied; or may be a location having a highest probability of being a location at which the in-flight load is expected to be applied; or may be a location at which the in-flight load is expected to be applied for the largest proportion of the flight time; or may be a location at which the in-flight load is expected to be applied when flight conditions are ideal; or may be a location selected based on a combination of the preceding considerations (and/or any other relevant considerations).

Figure 3A:
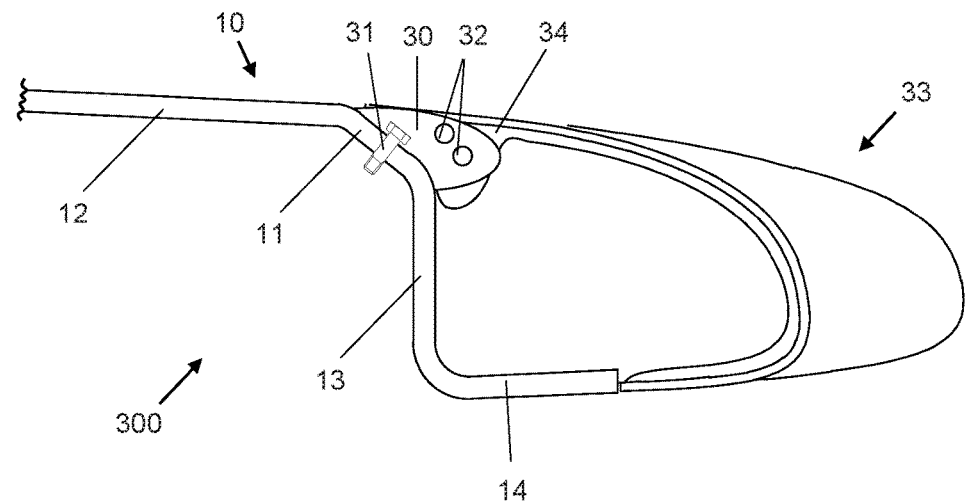
FIG. 3a shows a schematic cross-section through part of the example torsion box of FIG. 2, having a first example mounting feature.
Figure 3B:
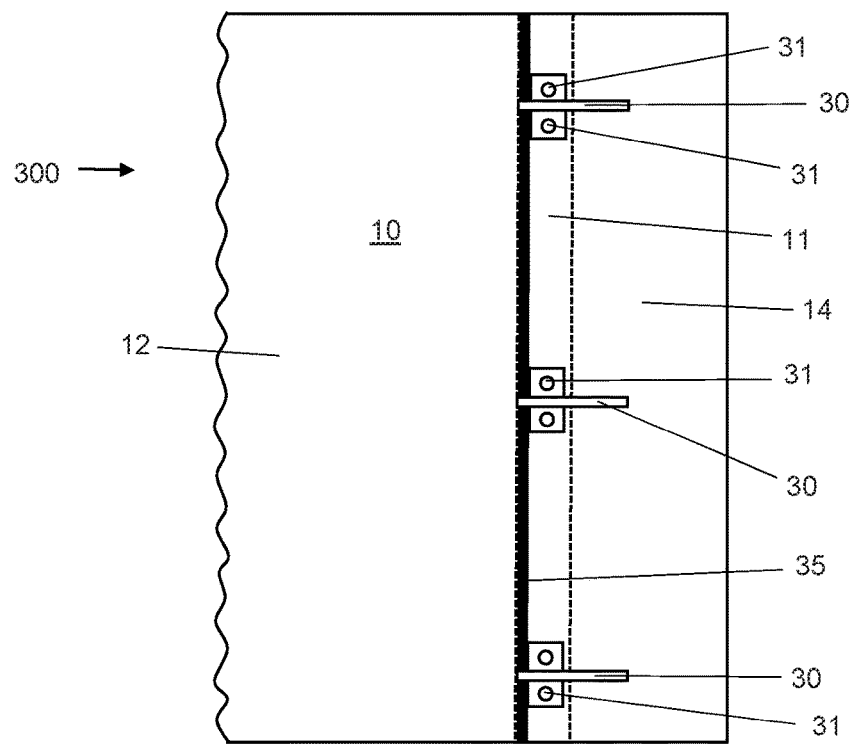

FIGS. 3*a* and 3*b* show an example component 300 for an aerofoil structure. The component 300 comprises the unitary member 10 of FIG. 2 and a plurality of mounting features 30 for mounting a leading or trailing edge structure of an aerofoil. An example leading edge structure 33 is mounted on the component 300, by way of the mounting features 30. In particular, an upper part of the leading edge structure 33 is fixed to the mounting features 30 and a lower part of the leading edge structure 33 is fixed to the flange 14, e.g. using a conventional arrangement of butt straps and fasteners.

Each of the mounting features 30 extends from the intermediate section 11 of the unitary member 10 in a streamwise direction. In the illustrated example, each mounting feature 30 comprises a bracket which is fixedly attached to the intermediate section. In the particular example, the attachment is achieved by bolts 31, which pass through holes in the mounting features 30 and corresponding holes in the intermediate section 11. In the particular example, each bracket 30 comprises two holes 32 arranged to line up with corresponding holes (not visible) in mounting features 34 comprised in the leading edge structure 33. The upper part of the leading edge structure 33 may therefore be fixed to the component 300 by bolting the mounting features 34 to the brackets 30, through their respective holes. The brackets 30 may comprise lugs (e.g. integrally-machined aluminium lugs), or any other suitable type of bracket known in the art. In some examples the brackets may extend further in the downwards direction (that is, towards the flange 14), and in such examples each bracket may be additionally fixed to the spar 13.

As can be seen from FIG. 3*b*, the plurality of brackets 30 are spaced along the intermediate section 11 of the unitary member 10 in the spanwise direction. The spacing of the brackets 30 may be relatively large compared with the spacing between adjacent fasteners used to attach a leading edge structure to a conventional wingbox. Typically, an example aerofoil structure comprising a component according to the invention may have between 1 and 4 brackets 30 per meter, as compared with around 30 fasteners per meter for an aerofoil structure based on a conventional wingbox. In some examples the spacing (pitch) of the brackets 30 may be in accordance with a predetermined arrangement corresponding to an arrangement of the mounting features 34 on the leading edge structure 33. The spacing of the brackets 30 (and/or the spacing of corresponding mounting features 34 on the leading edge structure 33) may be selected based on properties of the leading edge structure 33 and/or properties of a wingbox in which the component 300 is to be comprised. For example, the spacing or the brackets 30/mounting features 34 may be selected based on the stiffness of the leading edge structure and/or the stiffness of the wingbox, so as to avoid the creation of steps or gaps in the aerodynamic surface of the aerofoil structure when loaded. Typically, the stiffer the leading edge structure and wingbox, the fewer brackets and mounting features will be required in order to maintain a smooth aerodynamic surface during flight.

The strength (and therefore the size) of the brackets 30 which are required for a given application may be reduced or minimized by ensuring that most or all of the load reacted by the brackets 30 and bolts 31 is shear load. This can be achieved, for example, by selecting the values of the first and second angles $\alpha$, $\beta$, as described above. This need not be the case for all example unitary members according to the invention, but for examples in which a significant portion of the load on the brackets 30 and bolts 31 is not shear, the brackets 30 and bolts 31 will need to be relatively stronger (and therefore, typically, larger).

Some or all of the brackets 30 and/or the corresponding mounting features 34 may be configured to be moveable by a small amount in the spanwise direction, e.g. by including a flexible or deformable portion. Such movability can accommodate small deviations in the positions of the brackets 30 and/or the corresponding mounting features 34 from their expected positions (such deviations may occur, for example, as a result of manufacturing tolerances).

The example component 300 further comprises a seal 35 (visible in FIG. 3*b*) for sealing a gap between the cover and the leading edge structure 33 mounted to the component 300 by the brackets 30. The seal 35 may, for example, be a single-piece polymer seal, which may extend along the full length of the unitary member 10. Alternatively, any other suitable type of seal known in the art may be used. In some examples the seal 35 is only provided between adjacent brackets 30, and therefore comprises multiple pieces. The function of the seal 35 is to create a smooth aerodynamic surface at the join between the wing cover part 12 of the unitary member 10 and the leading edge structure 33.

Example components which comprise a plurality of mounting features like those illustrated by FIGS. 3*a* and 3*b* confer various advantages. As mentioned above, a conventional aerofoil structure uses a large number of fasteners to attach the leading (and trailing) edge structures to the wingbox. In comparison, the examples use significantly fewer fasteners. This is advantageous because it reduces penetrations into any fuel tanks comprised within the structure of the wingbox, and also reduces the risk associated with lightning striking such fuel tanks and consequently lessens the requirement to protect such fuel tanks against lightning strikes.

Moreover, it may be advantageous to attach a leading or trailing edge structure to a wingbox after aircraft systems (that is, leading edge or trailing edge systems) have been installed in the leading or trailing edge structure. With conventional attachment techniques, this is problematic because it involves drilling fastener holes into the leading/trailing edge structure with the leading/trailing edge structure already arranged in its intended final position adjacent the wingbox, and with the aircraft systems already present in that leading/trailing edge structure. This is because the fastener holes should be created through the wing box and leading/trailing edge structure simultaneously, to ensure correct alignment of the holes. However; creating the holes after the leading or trailing edge structure has been fully assembled and aircraft systems have been installed therein is disadvantageous because dust generated by the hole creation process can contaminate the interior of the leading or trailing edge structure, and the systems contained within.

Example components of the general type shown in FIGS. 3*a* and 3*b* can avoid this issue because the brackets and corresponding mounting features on the leading/trailing edge structure can be manufactured and positioned on the respective components to be attached together with a high degree of accuracy. This means that a leading/trailing edge structure can be attached to the component by positioning the leading/trailing edge structure adjacent the component and applying fastening means (e.g. bolts or fasteners) to fix each bracket to the corresponding mounting feature on the leading/trailing edge structure. Any required holes can be created at an early stage in the manufacture of a wingbox in which the component is comprised, and of the leading/trailing edge structure, and any dust created can be removed before aircraft systems are installed. These advantages of example components according to the invention also facilitate the use of interchangeable modular leading/trailing edge structures.

Figure 7:
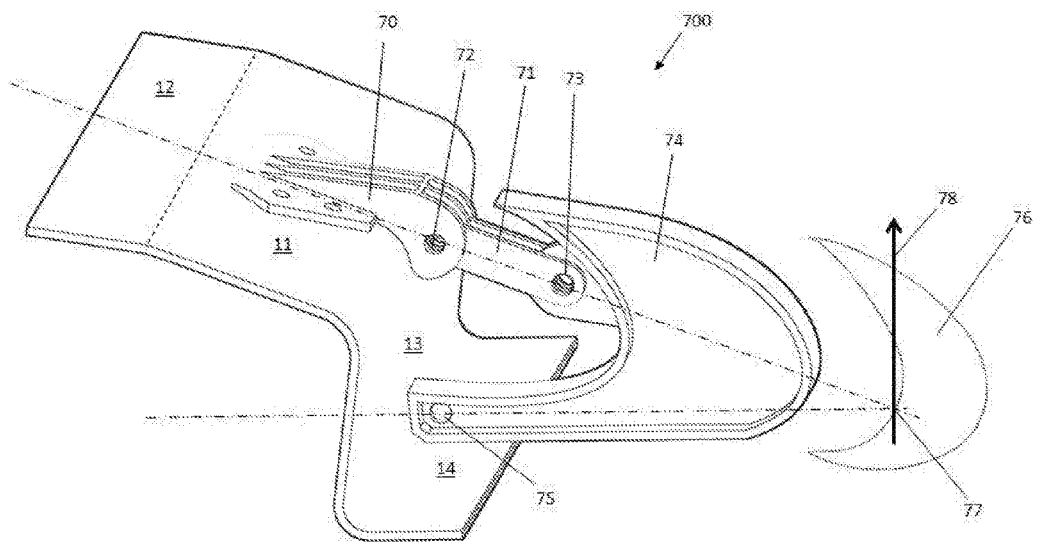
FIG. 7 shows a schematic perspective view of part of an example torsion box, having a third example mounting feature.

FIG. 7 shows part of an example component 700 for an aerofoil structure. The component 700 is of the same general type as the example component 300 of FIGS. 3*a* and 3*b*. The component 700 comprises the unitary member 10 of FIG. 2 and a plurality of mounting features 70 (only one is shown in FIG. 7) for mounting a leading or trailing edge structure of an aerofoil. A rib 74 of a leading edge structure (the other components of the leading edge structure are omitted for clarity) is mounted on the component 700, by way of one of the mounting features 70.

In particular, an upper part of the rib 74 is pivotally attached to the mounting feature 70 via a link 71 such that the rib (and indeed the rest of the leading edge structure) can pivot about a spanwise axis, and a lower part 75 of the rib 74 is fixedly attached to the unitary member 10 in any suitable manner, e.g. with fasteners. A rearward end of the link 71 is pivotally attached to the mounting feature 70 by a first pin 72 and a forward end of the link 71 is pivotally attached to a lug provided on the rear face of the rib 74 by a second pin 73. Each of the first and second pins 72, 73 is oriented to permit pivoting about a spanwise axis. Although in the illustrated example the link 71 has a double-arm structure, this need not be the case in other examples. Each of the mounting features 70 is of a similar design to the mounting features 30 of the example component 300, and may have any of the same features, except that each mounting feature 70 has a single hole for the first pin 72 rather than two bolt holes.

A moveable device 76 in the form of a slat is mounted on the leading edge structure in which the rib 74 is comprised. The moveable device 76 is attached to the rib 74 in any suitable manner, and may be actuated in any suitable manner. The attachment and actuation mechanisms associated with the moveable device 76 are not relevant to the invention and are not shown in FIG. 7. The moveable device 76 is configured to move between a retracted position in which the moveable device 76 abuts or is relatively close to the leading edge structure in the streamwise direction, and a deployed position (e.g. the fully deployed position shown in FIG. 7) in which the moveable device 76 is relatively further from the leading edge structure in the streamwise direction. Although the illustrated moveable device 76 is a slat, in other examples it may be any type of moveable device. It may be a high-lift device. Other examples are possible in which a component having similar features to the example component 700 is configured to be comprised in a rear part of an aerofoil structure, in which cases a trailing edge structure may be mountable on the component. Such a trailing edge structure may comprise or have mounted on it a trailing edge moveable device, such as a flap. The considerations discussed above and below in relation to the leading edge structure and the moveable device 76 may equally be applied to a trailing edge structure and a trailing edge moveable device.

Although not shown in FIG. 7, a plurality of mounting features 70 are spaced along the intermediate section 11 of the unitary member 10 in the spanwise direction, in a similar manner to the brackets 30 described above in relation to FIG. 3*b*. The same considerations discussed above in relation to the spacing of the brackets 30 also apply to the mounting features 70. Moreover, the example component 700 may additionally include any or all of the other features comprised in the example component 300 described above.

As discussed above, the strength (and therefore the size) of the mounting features 70 which are required for a given application may be reduced or minimized by ensuring that most or all of the load reacted by the mounting features 70 is shear load. This is achieved for the example component 700 by selecting the values of the first and second angles α, β, such that the surface of the intermediate part 11 of the component 10 is parallel to the direction of the load applied to the mounting features 70 when the moveable device 76 is in a selected deployed position. The selected deployed position may be a fully deployed position, or a position intermediate between a fully deployed position and a retracted position. The arrow 78 indicates the direction of a load experienced by the slat 76 during flight (which is applied at the point 77), and the dashed lines show how this load is transmitted to the lower rib attachment 75 and the mounting feature 70. It can be seen from FIG. 7 that the plane of the intermediate section 11 intersects the location on the moveable device 76 that corresponds to the point 77 at which the load is applied. The location of the load point 77 will be slightly different for other positions of the moveable device 76, however generally the greatest loads will be experienced when the moveable device 76 is in the fully deployed position, so the intermediate part 11 of the component 10 may be angled according to the fully deployed load point 77.

An advantageous effect of connecting the rib 74 to the mounting feature 70 via the link 71 and first and second pivot pins 72, 73 is that loads can only be transmitted along the link 71 in the direction of the axis linking the first and second pins 72, 73. For example, bending and twisting forces cannot be transmitted to the mounting feature 70. This contributes to enabling the mounting features 70 to be as small and light as possible. A further advantageous effect is that the leading edge structure can be attached to the mounting features 70 in a position rotated anti-clockwise with respect to its operational position. This enables the internal space of the leading edge structure to be accessed, e.g. to facilitate the installation of system. The leading edge structure can then be rotated clockwise into its operational position and the lower part 75 fixed to the component 10.

Figure 4A:
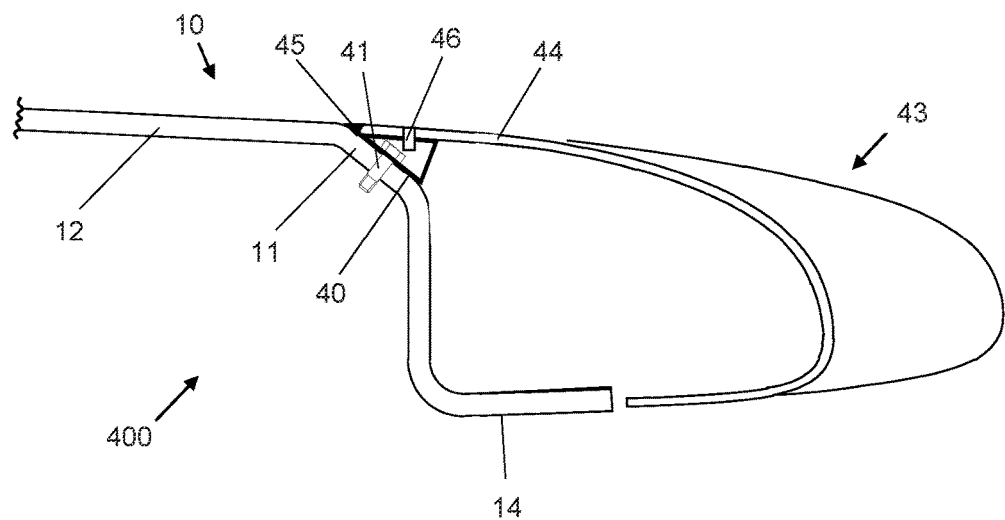
FIG. 4a shows a schematic cross-section through part of the example torsion box of FIG. 2, having a second example mounting feature.
Figure 4B:
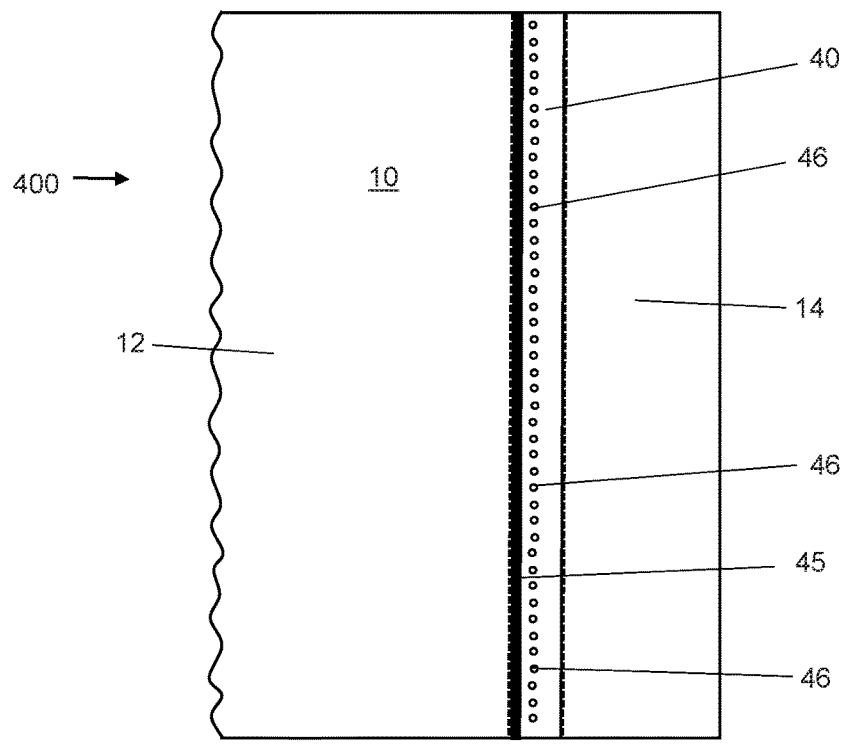

FIGS. 4a and 4b show an example component 400 for an aerofoil structure which comprises the unitary member 10 of FIG. 2 and a mounting feature 40 for mounting a leading or trailing edge structure of an aerofoil. An example leading edge structure 43 is mounted on the component 400, by way of the mounting feature 40. In particular, an upper part of the leading edge structure 43 is fixed to the mounting feature 40 and a lower part of the leading edge structure 43 is fixed to the flange 14, e.g. using a conventional arrangement of butt straps and fasteners.

The mounting feature 40 comprises a bar having at least one substantially flat face, wherein the at least one substantially flat face is fixedly attached to the intermediate section. In the particular illustrated example, the bar is a hollow tube which has a substantially triangular cross-section. The cross-sectional shape of the bar 40 is configured to fill a space between the intermediate section 11 of the unitary member 10 and an upper part of the leading edge structure 43. In other examples the bar may be solid, or may have an open cross-section (e.g. a V-shaped cross-section). The bar 40 may comprise any suitable material, e.g. a metal or a plastic material. In some examples the bar extends for substantially the whole spanwise length of the unitary member 10. In other examples the bar may comprise a plurality of separate sections, each of which extends for part of the spanwise length of the unitary member 40. In the illustrated example the at least one substantially flat face of the bar 40 which is fixedly attached to the intermediate section 11 is fixed thereon by a plurality of bolts 41 (only one is visible in FIG. 4a), each of which passes through correspondingly located holes in the intermediate section 11 and in the substantially flat face of the bar 40.

In some examples the bar 40 is configured to house one or more aircraft system components which run along the aerofoil structure in the spanwise direction. For example, the bar 40 may function as a conduit for guiding electrical wires and/or any other type of cable or hose which may be present in the leading or trailing edge structure of an aircraft wing. In such examples the bar 40 may comprise features to retain one or more aircraft system components, such as cable or hose clips or mounting features to which cable or hose clips can be attached.

The upper part of the leading edge structure 43 may be fixed to the component 400 by a series of fasteners 46 which pass through correspondingly located holes in the upper part of the leading edge structure 43 and an upper face of the bar 40. The fasteners 46 and associated holes may be of any suitable type known in the art. For example, the fasteners 46 and associated holes may be of the same type as is typically used to attach a leading/trailing edge structure to a conventional wingbox. The fastener holes in the leading edge structure and the bar may be created simultaneously, with the leading edge structure already positioned in a final position adjacent the component 400.

The exact construction of the bar 40 and/or the number, size and spacing of the fasteners used to fix the upper part of the leading edge structure 43 to the bar 40 may be selected in dependence on the configuration of the unitary member 10. For example, the size and strength of the bar 40 and/or the fasteners 46, and/or the number of fasteners 46, may be reduced or minimized by ensuring that most or all of the load reacted by the bar 40 and bolts 41 is shear load. This can be achieved, for example, by selecting the values of the first and second angles α, β, as described above. This need not be the case for all example components according to the invention, but for examples in which a significant portion of the load on the bar 40 and bolts 41 is not shear, the bar 40 and bolts 41 will need to be relatively stronger and/or greater in number.

The example component 400 further comprises a seal 45. The seal 45 may, for example, be a single-piece polymer seal, which may extend along the full length of the unitary member 10. Alternatively, any other suitable type of seal known in the art may be used. The function of the seal 45 is to create a smooth aerodynamic surface at the join between the wing cover part 12 of the unitary member 10 and the leading edge structure 43.

Figure 5:
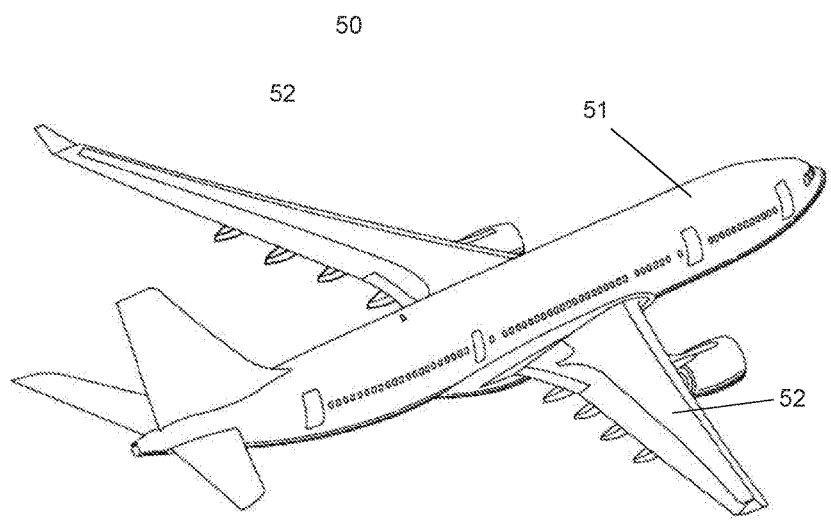
FIG. 5 shows an example aircraft comprising an example torsion box according to the invention.

FIG. 5 shows an example aircraft 50, which comprises an aerofoil structure according to the above-described examples. The aircraft 50 has a fuselage 51 and two wings 52, each of which is an aerofoil structure. The wings 52 are at least partly formed from a composite material. Each wing 52 comprises a torsion box (not visible), and each torsion box includes a component according to the invention. The components may have any or all of the features of the example components 100, 300 and 400 described above. In some examples one or both of the torsion boxes comprises two components according to the invention (that is, a leading component and a trailing component). In some examples one or both of the torsion boxes comprises a "double-ended component" in which a rear spar, a cover panel and a front spar are all integrally formed as a single unitary member. In such examples, one or both ends of the double-ended component may have the features of the example components described above. The aircraft may comprise further aerofoil structures, in addition to the wings 52, and such further aerofoil structures may be similarly constructed in that they comprise one or more components according to the invention.

Figure 6:
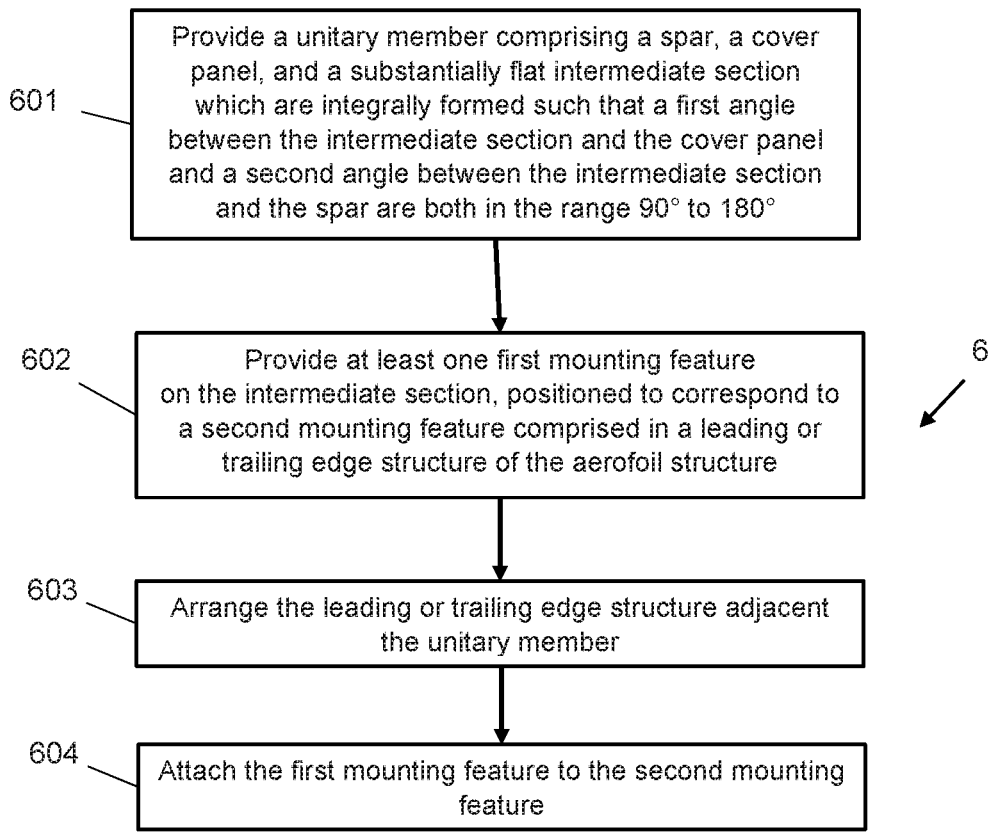
FIG. 6 is a flow chart of an example method for use in assembling an aerofoil structure.

As mentioned above, at least some examples according to the invention can facilitate advantageous methods of manufacturing/assembling an aerofoil structure which comprises a unitary member such as the unitary member 10 described above. FIG. 6 is a flow chart that implements an example method 6 for use in assembling an aerofoil structure. Although the method 6 is described primarily with reference to the particular component 300, the method 6 may be performed using any component according to the invention, and the components referred to may have any of the features described above in relation to the any of the example components 100, 300 and 400.

In a first block 601 a unitary member is provided. The unitary member comprises a spar, a cover panel, and a substantially flat intermediate section connecting the spar to the cover panel. The spar, cover panel and intermediate section are integrally formed such that a first angle between the intermediate section and the cover panel and a second angle between the intermediate section and the spar are both in the range 90° to 180°. The unitary member may have any or all of the features of the unitary member 10 described above. The unitary member may be provided as part of a torsion box (e.g. a wingbox). Alternatively, the unitary member may be provided in isolation, in which case it may be attached to one or more further components to form a torsion box after completion of the method 6.

In block 602 at least one first mounting feature is provided on the intermediate section, positioned to correspond to a second mounting feature comprised in a leading or trailing edge structure of the aerofoil structure. The at least one first mounting feature may have any or all of the features of the brackets 30 or the bar 40 described above. In a particular example, the at least one first mounting feature comprises a plurality of brackets which, when provided on the intermediate section, extend out from the intermediate section in the streamwise direction. In some examples the at least one first mounting feature comprises a first preformed fastener hole, which may be positioned to correspond to a second preformed fastener hole on the second mounting feature. A "preformed" fastener hole is formed before the leading or trailing edge structure is arranged in its intended final position adjacent a wingbox in which the unitary member is comprised. A preformed fastener hole may be formed before or at the same time as the mounting feature in question is provided on the intermediate section or the leading or trailing edge structure. Alternatively, a preformed fastener hole may be formed after the mounting feature is provided on the intermediate section or the leading or trailing edge structure, but before the leading or trailing edge structure is arranged in its intended final position adjacent a wingbox in which the unitary member is comprised. A fastener hole which is created in a mounting feature after the leading or trailing edge structure comprising that fastener hole is arranged in its intended final position adjacent a wingbox in which the unitary member is comprised is not considered to be preformed.

Providing the at least one first mounting feature on the intermediate section may comprise fixedly attaching the at least one first mounting feature to the intermediate section, e.g. using one or more bolts or fasteners. The at least one first mounting feature may be provided at a predetermined location on the intermediate section, which may be determined in dependence on a location of a corresponding mounting feature comprised in the leading or trailing edge structure. Providing the at least one first mounting feature on the intermediate section may comprise providing the at least one first mounting feature according to a predetermined arrangement based on an arrangement of second mounting features comprised in the leading or trailing edge structure.

In block 603, the leading or trailing edge structure is arranged adjacent the unitary member. Arranging the leading or trailing edge structure adjacent the unitary member may comprise, for example, supporting and/or maintaining the leading or trailing edge structure and the unitary member in a relative configuration which is substantially the same as the intended relative configuration of the leading or trailing edge structure and the unitary member in the completed aerofoil structure. When the leading or trailing edge structure is arranged adjacent the unitary member, the at least one first mounting feature may be adjacent the second mounting feature. In examples in which the at least one first mounting feature comprises a first preformed fastener hole and the second mounting feature comprises a second preformed fastener hole, the first preformed fastener hole may be substantially aligned with the second preformed fastener hole on completion of block 603. In examples in which the at least one first mounting feature is moveable in the spanwise direction, performing block 603 may comprise adjusting the spanwise location of the at least one first mounting feature, e.g. such that it corresponds to the spanwise location of the second mounting feature. In some examples, a seal may be provided between the leading or trailing edge structure and the unitary member during performance of block 603. During block 603 the leading or trailing edge structure may contain aircraft systems which have been installed in the leading or trailing edge structure before it is arranged adjacent the unitary member.

In block 604, the at least one first mounting feature is attached to the second mounting feature. Any suitable attachment technique or mechanism may be used, such as bolts, clamps or fasteners. In examples in which the first mounting feature comprises a first preformed fastener hole and the second mounting feature comprises a second preformed fastener hole, attaching the first mounting feature to the second mounting feature comprises inserting a fastener through the first and second preformed fastener holes. Where the unitary member is provided with multiple first mounting features, each corresponding to a second mounting feature on the leading or trailing edge structure, performing block 604 comprises attaching each first mounting feature to its corresponding second mounting feature. Relative movement between the leading or trailing edge structure and the unitary member may be substantially prevented upon completion of block 604.

The example method eliminates the need to drill or otherwise create any fastener holes (or other mounting holes) at a relatively late stage of the aerofoil structure assembly process. Instead, all such features can be created during initial manufacture/assembly of the torsion box and of the leading or trailing edge structure. Contamination of these structures and any aircraft systems contained therein can thereby be avoided. Furthermore, the example method is suitable for use in attaching and interchanging modular leading or trailing edge structures to a wing box having a unitary member according to the examples.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A component for an aerofoil structure, the component comprising a unitary member which comprises:
   a spar;
   a cover panel; and
   a substantially flat intermediate section which connects the spar to the cover panel, said intermediate section comprising a substantially flat outer surface configured to accomodate a mounting feature;
   wherein the spar, the cover panel and the intermediate section are integrally formed such that a first angle between the intermediate section and the cover panel and a second angle between the intermediate section and the spar are both in a range 90° to 180°.

2. The component according to claim 1, wherein the first angle and the second angle are selected such that a plane of the intermediate section intersects a location on a leading or trailing edge part of the aerofoil structure at or near a location at which an in-flight load is expected to be applied to the aerofoil structure.

3. The component according to claim 1, wherein the first angle and the second angle are selected such that a plane of the intermediate section intersects a location on a moveable device mounted on a leading or trailing edge part of the aerofoil structure, when the moveable device is in a deployed position, wherein the location is a location at which an in-flight load is expected to be applied to the moveable device.

4. The component according to claim 1, further comprising at least one mounting feature extending from the intermediate section in a streamwise direction, for facilitating attachment of a leading or trailing edge structure of the aerofoil to the component.

5. The component according to claim 4, wherein the at least one mounting feature comprises a plurality of brackets fixedly attached to the intermediate section.

6. The component according to claim 5, wherein the plurality of brackets are spaced along the intermediate section in the spanwise direction according to a predetermined arrangement corresponding to an arrangement of mounting features on a leading or trailing edge structure which is to be attached to the component.

7. The component according to claim 5, wherein each bracket is configured to pivotally attach to a leading or trailing edge structure of the aerofoil, such that the leading or trailing edge structure is pivotable about a spanwise axis.

8. The component according to claim 7, wherein each bracket comprises at least one hole extending through the bracket in a spanwise direction, for receiving a pivot pin.

9. The component according to claim 4, wherein the at least one mounting feature comprises a bar having at least one substantially flat face, wherein the at least one substantially flat face is fixedly attached to the intermediate section.

10. The component according to claim 9, wherein the bar is configured to house one or more aircraft system components which run along the aerofoil structure in the spanwise direction.

11. The component according to claim 4, further comprising a seal for sealing a gap between the cover and a leading or trailing edge structure attached to the component by the at least one mounting feature.

12. The component according to claim 1, wherein the cover panel forms part of an outer surface of the aerofoil structure.

13. The component according to claim 1, wherein the spar, intermediate section and cover panel comprise a unitary piece of a composite material.

14. An aerofoil structure comprising the component according to claim 1.

15. The aerofoil structure according to claim 14, further comprising a leading or trailing edge structure attached to the component, wherein:
   the component further comprises at least one mounting feature extending from the intermediate section in a streamwise direction; and
   an upper part of the leading or trailing edge structure is pivotally attached to the at least one mounting feature such that the leading or trailing edge structure is pivotable about a spanwise axis.

16. The aerofoil structure according to claim 15, comprising a link member disposed between the upper part of the leading or trailing edge structure and the at least one mounting feature, wherein a first end of the link member is pivotally attached to the at least one mounting feature such that that the link member is pivotable about a spanwise axis, and a second end of the link member is pivotally attached to the leading or trailing edge structure, such that the leading or trailing edge structure and the link member are each pivotable about a spanwise axis.

17. The aerofoil structure according to claim 14, wherein the aerofoil structure is an aircraft wing.

18. A method for use in assembling an aerofoil structure, the method comprising:
   providing a unitary member comprising a spar, a cover panel, and a substantially flat intermediate section connecting the spar to the cover panel and comprising a substantially flat outer surface, wherein the spar, cover panel and intermediate section are integrally formed such that a first angle between the intermediate section and the cover panel and a second angle between the intermediate section and the spar are both in a range 90° to 180°;
   providing at least one first mounting feature on the intermediate section, positioned to correspond to a second mounting feature comprised in a leading or trailing edge structure of the aerofoil structure;

arranging the leading or trailing edge structure adjacent the unitary member; and attaching the first mounting feature to the second mounting feature.

19. The method according to claim 18, wherein providing at least one first mounting feature on the intermediate section comprises providing the at least one first mounting feature according to a predetermined arrangement based on an arrangement of second mounting features comprised in the leading or trailing edge structure.

20. The method according to claim 18, wherein the at least one first mounting feature comprises a first preformed fastener hole, the second mounting feature comprises a second preformed fastener hole, and attaching the first mounting feature to the second mounting feature comprises inserting a fastener through the first and second preformed fastener holes.

21. A component for an aerofoil structure including:
a spar;
a cover panel; and
an intermediate section connected on one side to the spar and on an opposite side to the cover panel;
wherein an outer surface of the intermediate section is in the plane, and at least a majority of the are of the outer surface is flat;
wherein the spar, the cover panel and the intermediate section are a single piece panel; and
wherein a plane extending through the intermediate section forms a first angle with the cover panel and a second angle with the spar, and the first angle and second angle are each in a range of 90° to 180°.

22. The component of claim 21 further including a bracket attached to the intermediate section, wherein the mount is configured to attached to a leading or trailing edge structure.

23. The component of claim 21 wherein the plane extending through the intermediate section extends through a portion of the leading or trailing edge.

24. The component of claim 21 wherein the plane extending through the intermediate section extends through a lower portion of the leading or trailing edge.

* * * * *